United States Patent [19]

Nagel et al.

[11] 4,410,054
[45] Oct. 18, 1983

[54] WELL DRILLING TOOL WITH DIAMOND RADIAL/THRUST BEARINGS

[75] Inventors: Dave D. Nagel; Thomas Aparicio, Jr., both of Houston, Tex.

[73] Assignee: Maurer Engineering Inc., Houston, Tex.

[21] Appl. No.: 327,105

[22] Filed: Dec. 3, 1981

[51] Int. Cl.³ .............................................. E21B 4/02
[52] U.S. Cl. ...................................... 175/107; 384/95
[58] Field of Search ...................... 175/107, 171, 172; 308/8.2, 239, 160, 159, 158

[56] References Cited

U.S. PATENT DOCUMENTS 4,114,703  9/1978  Matson, Jr. et al. .................. 175/40
4,190,301  2/1980  Lachonius et al. ................. 175/329

FOREIGN PATENT DOCUMENTS 394539  12/1973  U.S.S.R. ............................... 308/8.2

Primary Examiner—Stephen J. Novosad
Assistant Examiner—Joseph Falk
Attorney, Agent, or Firm—Neal J. Mosely

[57] ABSTRACT

A turbodrill is disclosed for connection to a drill string and has a rotating shaft for turning a drill bit. The turbodrill has rotor and stator blades operated by drilling mud flowing therethrough to rotate the shaft. The shaft is provided with radial/thrust bearing consisting of a pair of annular plates, each of which has conical surfaces supporting a plurality of friction bearing members of polycrystalline diamond. The radial and thrust loads are carried by the wear-resistant diamond bearing surfaces. The bearing members are preferably cylindrical studs having flat faces with flat disc-shaped diamond bearing members supported thereon around the adjacent surfaces of the supporting plates. The faces of the diamond bearings will wear into smoothly mating conical bearing surfaces with use. There are two or more pairs of diamond radial/thrust bearings to handle longitudinal as well as radial loads. The use of the diamond radial/thrust bearings makes it possible to eliminate the lubricant-flooded construction of prior art turbodrills and allow the bearings to be cooled and lubricated be drilling fluid flowing therethrough. The diamond radial/thrust bearings may be used with lubricant-flooded turbodrills and with other types of downhole motor driven drills such as drills driven by positive displacement motors.

20 Claims, 17 Drawing Figures

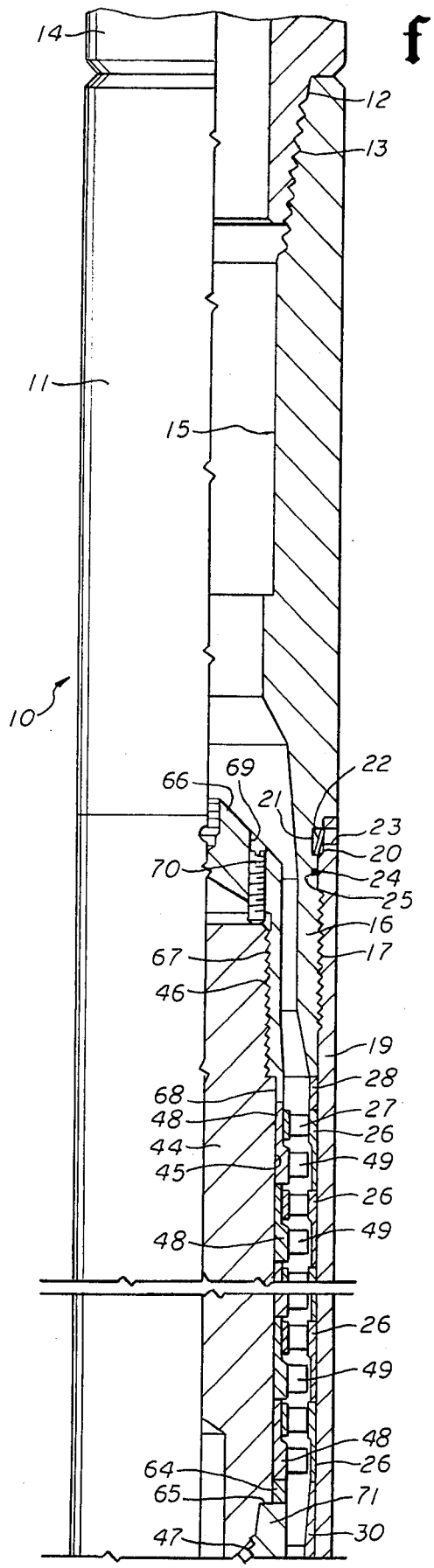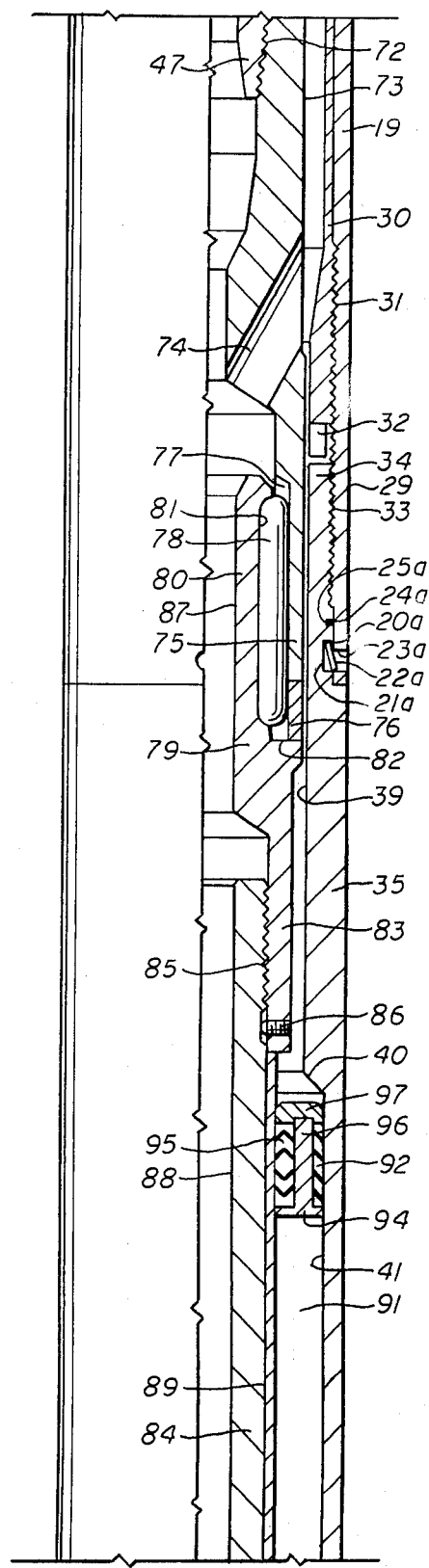

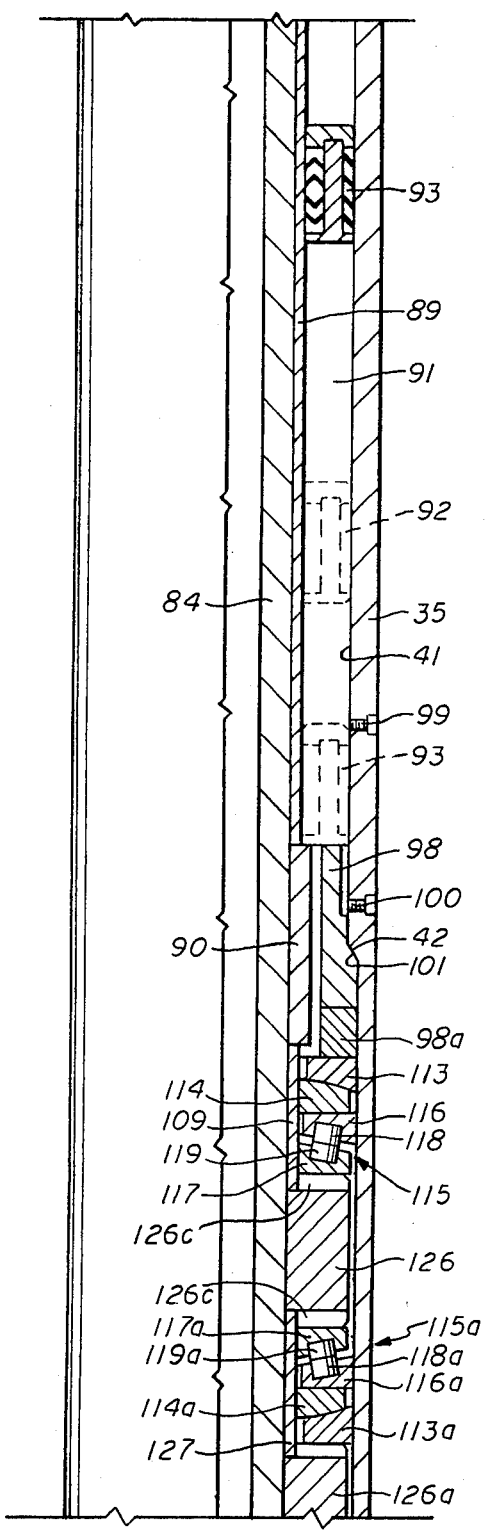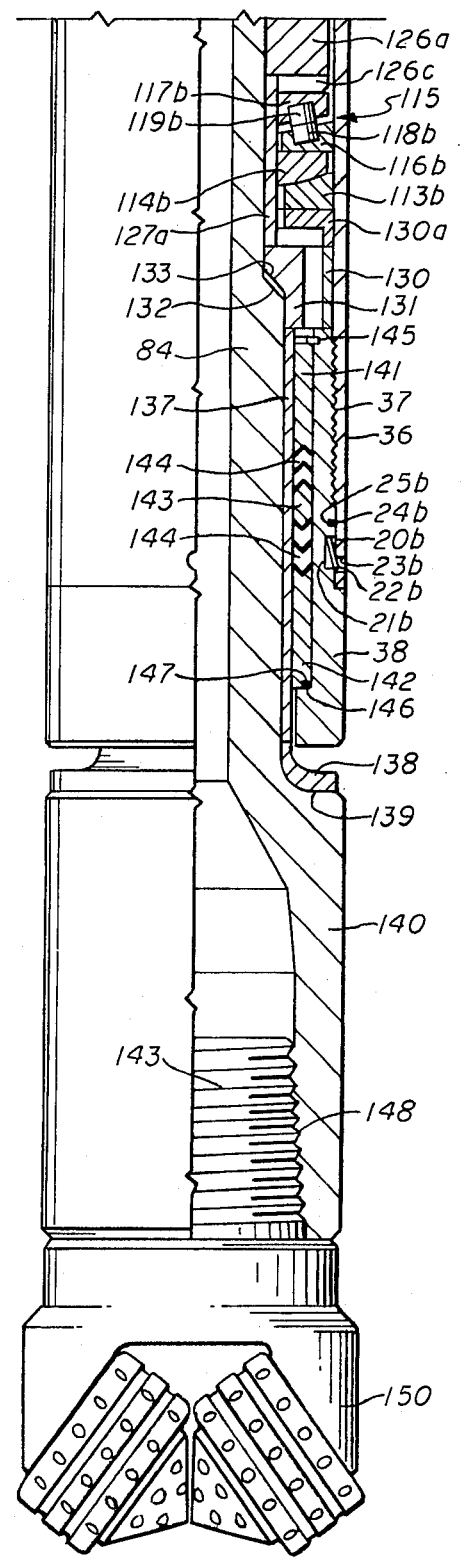

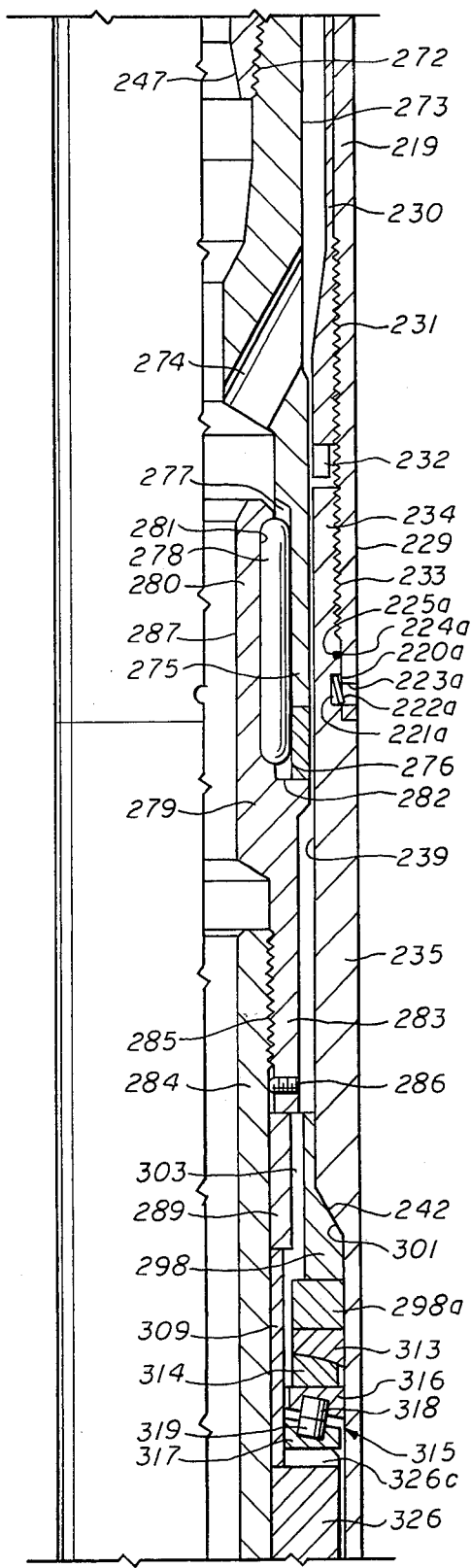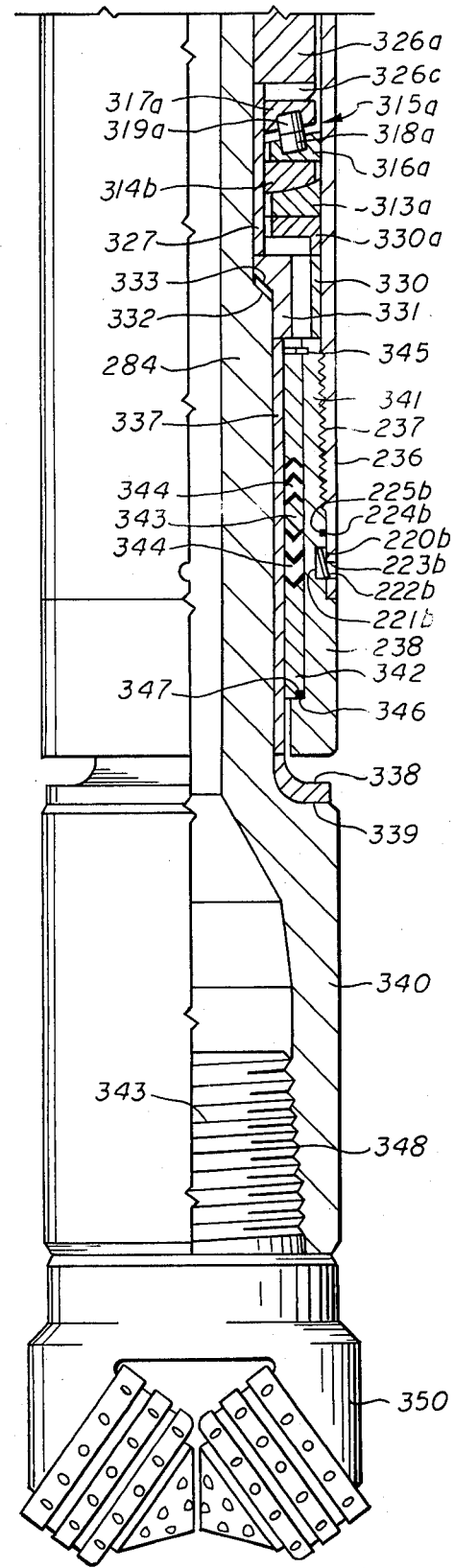

fig.2
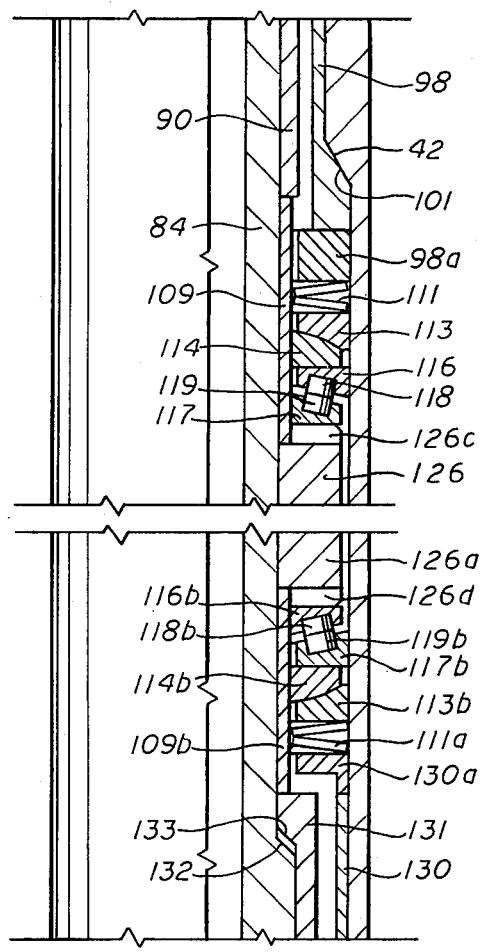
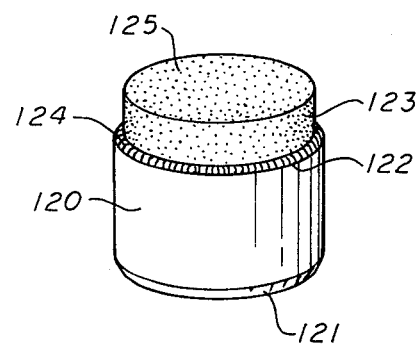
fig.3
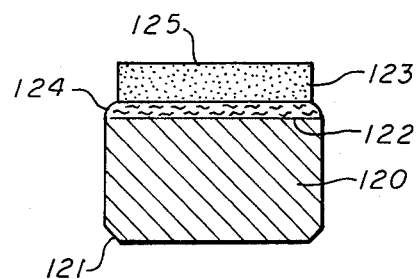
fig.4

WELL DRILLING TOOL WITH DIAMOND RADIAL/THRUST BEARINGS

CROSS REFERENCE TO RELATED APPLICATION

This application discloses, in part, subject matter disclosed in co-pending application Ser. No. 306,290, filed Sept. 28, 1981.

BACKGROUND OF THE INVENTION

1. Field of the Invention

This invention relates to down-hold drilling motors, such as turbodrills and drills operated by positive displacement motors, and more particularly to improved bearings used therein.

2. Brief Description of the Prior Art

Down-hole drilling motors were first invented 100 years ago. Down-hole drilling motors were first extensively tested in the 1920's. They did not find wide spread use until the 1950's when turbodrills began to be used in the Soviet Union. By the early 1960's, it is estimated that 85% of the wells in the Soviet Union were being drilled with turbodrills. Down-hole drilling motors have found widespread use in the United States for drilling directional holes, but they are not widely used for straight hole drilling because of bearing and seal problems.

Commercial down-hole drilling motors operate most effectively at speeds of 50 to 150 rpm. At high motor speeds, roller bearings fail after periods of about 5 to 15 hours whereas with conventional drilling equipment operating at lower speeds the bearings of roller bit last up to 200 hours. Also, with roller bearings, it has been virtually impossible to design a single, long lasting bearing which will carry both radial and longitudinal thrust loads. Down-hole motors have had substantial problems in design of radial and vertical thrust bearings, lubrication systems, turbine efficiency, housing construction, etc., which have limited substantially the acceptability of down-hole motors in petroleum drilling and in other applications.

Down-hole drilling motors were patented soon after the advent of rotary drilling rigs in the 1860's.

Cross U.S. Pat. No. 174,922 discloses a very primitive turbodrill.

Baker U.S. Pat. No. 292,888 discloses a single stage axial flow turbodrill which is similar in some respects to modern turbodrills.

Scharpenberg U.S. Pat. No. 1,482,702 discloses one of the earliest multi-stage turbodrills which was the forerunner of turbodrills currently in use. The Scharpenberg turbodrill contained a lubrication system which allowed the thrust bearing to operate in oil or grease. Drilling fluid acting on a floating piston pressurized the lubricant in the system.

Capeliuschnicoff U.S. Pat. No. 1,681,094 discloses a single staged geared turbodrill. These turbodrills were tested extensively in the Sovient Union from 1924 to 1934. The Soviets had severe problems with the speed reducing Capeliuschnicoff turbodrill and subsequently changed to the Scharpenberg turbodrill. Several Soviet engineers perfected multi-stage turbodrills during the 1940's and 1950's and by the early 1960's, the Soviets were drilling 80 to 90% of their wells with axial flow turbodrills. The Soviets licensed turbodrill technology to companies on the United States, France, Germany and Austria. Turbodrills have had a rather limited commercial acceptance and are used primarily in directional wells.

virtually all down-hole drilling motors have four basic components;
1. Motor section
2. Vertical thrust bearings
3. Radial bearings
4. Rotary seal.

The bearings and seals can be placed in a separate package or unit at the motor section and thus can be used on any type of motor (i.e. turbodrills, positive displacement motors, etc.)

There are two basic types of down-hole drilling motors:
1. Turbodrills
2. Positive displacement Turbodrills utilize the momentum change of drilling fluid (i.e. mud) passing through the curved turbine blades to provide torque to turn the bit. Diamond bits are used on most turbodrills because these motor turn at speed of 600 to 1,000 rpm whereas roller-type rock bits operate effectively only at speeds up to about 150 rpm. Positive displacement motors have fixed volumetric displacement and their speed is directly proportional to the flow rate. There are three basic types of positive displacement motors in use or currently under development:
1. Moineau motors
2. Flexing vane motors
3. Sliding vane motors These motors have large volumetric displacement and therefore deliver higher torques at lower speeds.

Thrust bearing failure in down-hole motors is a problem because of high dynamic loads produced by the action of the bits and by drill string vibrations. One major oil company placed a recorder at the hole bottom and found that dynamic loads were often 50% higher than the applied bit weight. It was found on occasion that the bit bounced off bottom and produced loads in excess of 120,000 pounds when drilling at an applied bit weight of 40,000 pounds. These high loads can cause rapid failure of the thrust bearings; consequently these bearings must be greatly over designed to operate in the hostile down-hole environment.

Two types of thrust bearing have been used in down-hole drilling motors:
1. Rubber friction bearings
2. Ball or roller bearings.

In prior art motors, these bearings operate directly in the abrasive drilling mud and usually wear out in 20 to 100 hours. In addition, the rubber friction bearings have high friction and therefore absorb 30 to 40% of the output torque of the turbodrills. The lift of the vertical thrust bearings can be increased by operating at bit weights which nearly balance the hydraulic down thrust thereby removing most of the load from these bearings.

Radial bearings are required on each side of drilling motors and on each side of the vertical thrust bearings. These radial bearings are usually subjected to lower loads than the thrust bearings and therefore have a much longer life. Two basic types of radial bearings are used in the down-hole motors:
1. Marine bearings
2. Roller or ball bearings Most motors contain marine bearings made of brass, rubber or similar bearing materials. The marine bearings are cooled by circulating mud through them.

In the commonly assigned U.S. Pat. Nos. 4,114,702; 4,114,703 and 4,114,704 an improved turbodrill is disclosed which utilizes roller bearings both for radial bearings and longitudinal thrust bearings.

It is well known that diamond bits are used for earth drilling having natural or synthetic diamonds bonded to supporting metallic or carbide, studs or slugs. There are several types of diamond bits known to the drilling industry. In one type, the diamonds are a very small size and randomly distributed in a supporting matrix. Another type contains diamonds of a larger size positioned on the surface of a drill shank in a predetermined pattern. Still another type involves the use of a cutter formed of a polycrystalline diamond supported on a sintered carbide support.

Some of the most recent publications dealing with diamond bits of advanced design are Rowley, et al. U.S. Pat. No. 4,073,354 and Rohde, et al. U.S. Pat. No. 4,098,363. An example of cutting inserts using polycrystalline diamond cutters and an illustration of a drill bit using such cutters, is found in Daniels, et al. U.S. Pat. No. 4,156,329.

The most comprehensive treatment of this subject in the literature is probably the chapter entitled STRATAPAX bits, pages 541–591 in Advanced Drilling Techniques, by William C. Maurer, The Petroleum Publishing Company, 1421 South Sheridan Road, P. O. Box 1260, Tulsa, Okla., 74101, published in 1980. This reference illustrates and discusses in detail the development of the STRATAPAX diamond cutting elements by General Electric and gives several examples of commercial drill bits and prototypes using such cutting elements.

Polycrystalline diamond inserts have had extensive treatment in the literature as cutting elements for drill bits but there has been no suggestion of the use or application of diamond elements for friction bearings and particularly for bearings in turbodrills where the conditions of load and wear are severe.

In co-pending application, Ser. No. 306,290, filed Sept. 28, 1981, there is disclosed a turbodrill having longitudinal thrust bearings consisting of polycrystalline-diamond-faced carbide inserts used in combination with conventional radial bearings.

Rotary seals have been the weakest link in down-hole motor design. Improved seals, particularly in combination with improved bearing designs, would allow the bearings to be sealed in lubricant, thereby increasing their life substantially. Improved seals would allow bits to be operated at higher pressures thereby greatly increasing drilling rate.

There are six basic types of seals that have been tested in down-hole motors:
1. Packing seals
2. Face seals
3. Labyrinth seals
4. Radial lip seals
5. Constrictions (friction bearings and marine bearings)
6. Flow metering seals Some drilling motors allow drilling mud to continuously leak through the rotary seals by constricting the flow with any of a variety of seals permitting leakage. Sand and other abrasive particles are filtered out of the mud in the rotary seals which results in rapid failure of the seals. It has been thought that any substantial improvement in turbodrill design will require positive seals which allow no appreciable leakage.

SUMMARY OF THE INVENTION

This invention is an improved down-hole well drilling tool having improved long-lasting bearings carrying both longitudinal and radial thrust loads. These bearings are particularly useful in turbodrills and in drills operated by positive displacement motors. This down-hole well drilling tool is connected at one end to the lower end of a drill string and at the other end to the drill bit to be driven thereby.

The drilling tool comprises a tubular housing having a rotary shaft supported therein and extending therefrom to support a rotary drill bit. The housing includes a suitable motor means, i.e. turbine, positive displacement motor, etc., actuated by flow of drilling fluid (i.e. drilling mud) therethrough and operable to rotate the shaft to rotate the drill bit.

The shaft is provided with diamond bearings which carry both radial loads and vertical or longitudinal thrust loads. The radial/thrust bearings consist of a pair of annular bearing plates, with complementary conical surfaces, each of which supports a plurality of friction bearing members having bearing faces of polycrystalline diamond. The entire radial and longitudinal thrust loads are carried by the angularly extending diamond bearing surfaces which are highly resistant to wear by the drilling mud flowing therethrough. The bearing members are preferably cylindrical studs having flat faces with initially flat disc-shaped diamond bearing members supported thereon. The diamond bearing faces wear into smooth conical bearing surfaces during use. There are preferably one more of the diamond bearing members on one of the annular bearing plates than on the other.

A suitable rotary seal is positioned below the bearings. A lubricant fluid (i.e. oil or grease) fills the space from the rotary seal to a predetermined level above the bearings. A floating piston seals the space above the lubricant under pressure for positive lubrication of the bearing. The use of the diamond radial/thrust bearings, however, makes it possible to eliminate the lubricant-flooded construction and allow the bearings to be cooled and lubricated be drilling fluid flowing therethrough. The diamond bearings may be used with other types of downhole motor driven drills such as drills driven by positive displacement motors.

BRIEF DESCRIPTION OF THE DRAWINGS

FIG. 1 is a view in longitudinal section (quarter section) of a turbodrill, in four successive parts viz., FIGS. 1A, 1B, 1C and 1D, substantially as shown in U.S. Pat. Nos. 4,114,702; 4,114,703 and 4,114,704, modified to include an improved polycrystalline diamond thrust bearing.

FIG. 1A is a view of the uppermost portion of a turbodrill, partly in elevation and partly in vertical section and further broken vertically to reduce the length of the turbine section.

FIG. 1B is a view partly in elevation and partly in vertical section of the next successive lower portion of the turbodrill and illustrating an improved turbine seal.

FIG. 1C is a view of the next lower portion of the turbodrill partly in section and illustrating an improved seal and an improved diamond radial/longitudinal thrust bearing arrangement therein.

FIG. 1D is a view of the turbodrill partly in elevation and partly in vertical section showing the bottommost portion of the drill including another of the diamond bearings, as well as the connection from the drill motor to the drill bit.

FIGS. 1E and 1F are views corresponding to FIGS. 1B, 1C and 1D of an alternate embodiment of the turbodrill in which the piston-operated lubrication system has been eliminated and the turbodrill shortened substantially.

FIG. 2 is a sectional view, of a portion of FIG. 1C, showing an alternate embodiment of the radial/thrust bearing.

FIG. 3 is an isometric view of one of the diamond bearing inserts shown in FIG. 1C.

FIG. 4 is a view in longitudinal central section of the bearing insert of FIG. 3.

DESCRIPTION OF THE PREFERRED EMBODIMENT

Figure 6:
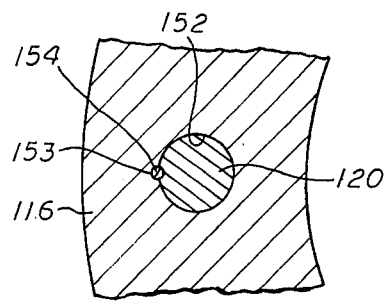
FIGS. 5 to 12, inclusive show a number of different embodiments for retention of the diamond bearing elements in the bearing supporting plates.

Referring to the drawings by numerals of reference and more particularly to FIGS. 1A to 1D, inclusive, there is shown a turbodrill which is generally designated 10. Turbodrill 10 is very long in relation to its width and requires FIGS. 1A, 1B, 1C and 1D to show its entire structure even though a substantial portion of the turbine section is omitted in FIG. 1A. A typical turbodrill of this design which is 7¾ inches in diameter is about 20.5 feet long. The turbine section represents almost half the length of the turbodrill and it is therefore necessary to omit a large portion of the multi-stage turbine.

THE TURBINE SECTION

At the upper end of the turbodrill 10 there is provided a stator housing sub 11 having a threaded box end portion 12 forming a threaded connection 13 with the lower end of a drill string 14. Stator housing sub 11 has an internal longitudinal passage 15 communicating with the open end of drill string 14.

Stator housing sub 11 has a threaded pin portion 16 which is threadedly connected as at 17 in the box end portion 18 of the stator housing 19. Stator housing box portion 18 has an internal annular groove 20 therein which mates, when assembled, with an annular grove 21 in the pin portion 16 of stator housing sub 11. A lock ring 22 extends peripherally around the turbodrill in the annular space provided by matching grooves 20 and 21 and abuts the walls of said grooves to prevent disassembly of said stator housing from said stator housing sub accidentally.

Figure 7:
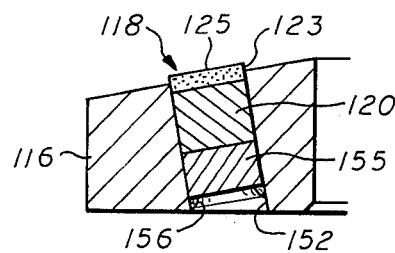
Figure 11:
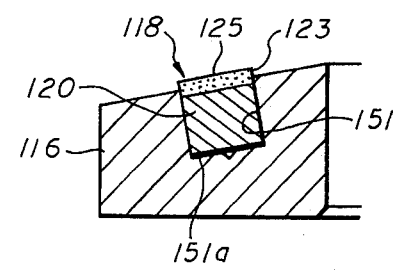

Stator housing box portion 18 is also provided with a plurality of holes 23 uniformly spaced to provide points for application of pressure on lock ring 22 to permit separation of stator housing 19 from stator housing sub 11. Details of this feature of construction are shown in FIGS. 6 and 7 of U.S. Pat. No. 4,114,702. Threaded connection 17 is sealed against leakage by "O" ring 24 positioned in groove 25.

The turbine section of the turbodrill is positioned in the stator housing 19 just below the threaded joint 17 connecting to the stator housing sub 11. The stator portion of the turbine consists of a plurality of stator members 26 which are shown in more detail in FIGS. 3, 3A, 4 and 5 of U.S. Pat. No. 4,114,702. The stator members 26 are annular in shape and provided with vanes or blades 27 which are described more fully in said patent.

Stator members 26 have an exterior surface providing a sliding fit in the inner surface of stator housing 19 and are positioned as a stack of abutting members extending longitudinally therein. In a typical turbodrill having a 7¾ inch diameter, there are 50 of the stator members made of a hard beryllium copper alloy which is wear-resistant and which has a slightly higher coefficient of expansion than the steel of stator housing 19.

The stack of stator members 26 is maintained under compression in the stator housing 19 with the result that the members are expanded to fit tightly against the inner surface of stator housing 19 and resist slippage therein. Also, because of the higher thermal coefficient of expansion, the stator members 26 tend to expand more at the high temperatures encountered in use of the turbodrill with the result that the increase in temperature encountered during operation causes stator members 26 to fit more tightly within stator housing 19 and effectively prevents slippage therein.

At the upper end of stator housing 19, there is positioned an annular stator spacer 28 which positions the uppermost stator member 26 relative to the end of stator housing sub 11. At the lower end of stator housing 19 there is a box portion 29 which is internally threaded and receives tubular stator makeup sleeve 30 in a threaded joint 31. The lower end of sleeve 30 is notched as indicated at 32 to receive a wrench for tightening sleeve 30 in threaded joint 31.

When stator makeup sleeve 30 is tightened to the position shown, the upper end thereof abuts the lowermost stator member 26 and compresses the entire stack of stator members against each other and against annular stator spacer member 28. Stator makeup sleeve 30 when fully tightened maintains the stack of stator members 26 under sufficient compression to press them tightly against the inner surface of stator housing 19 and prevents slippage of the stator members during operation as described above.

The lower box end 29 of stator housing 19 is connected in a threaded joint 33 to the threaded upper pin end 34 of bearing pack housing 35. Just below threaded joint 33, there is provided annular groove 21a in bearing pack housing 35 and annular groove 20a in stator housing 19 and a spring lock ring 22a positioned therein to prevent separation of the members accidentally. The lower end of stator housing 19 is provided with holes 23a providing points for application of pressure on lock ring 22a to permit threaded joint 33 to be separated. An "O" ring 24a positioned in groove 25a prevents leakage of fluid through threaded joint 33.

Bearing pack housing 35 extends from threaded joint 33 at its upper end to a lower box end portion 36 which is internally threaded and has a threaded joint 37 with bearing makeup sub 38. At its extreme upper end, bearing pack housing 35 has an interior diameter defining an inner surface 39 which is an extension or projection of the inner surface of stator makeup sleeve 30. A short distance below the upper end of bearing pack 35, the interior diameter thereof is enlarged at beveled surface 40 to surface 41 defining a lubricant chamber which will be subsequently described in more detail. At the lower end of surface 41 defining lubricant chamber, there is a bevel or shoulder 42 opening into a still further enlarged portion having inner surface 43 enclosing the combined radial and longitudinal thrust bearings. Surface 43 terminates in the interior threaded portion at the lower box end 36 of the bearing pack housing.

At the upper end of the turbodrill, inside stator housing 19, there is a rotor shaft 44 which has a generally cylindrical exterior surface 45 terminating at the upper end in threaded portion 46 and at the lower end in threaded portion 47. Rotor shaft 44 has a plurality of rotor members 48 stacked thereon in abutting relationship and blades or vanes 49 vertically aligned with the stator vanes 27.

Stator member 26 comprises an outer sleeve and inner sleeve with vanes or blade members 27 positioned therebetween and uniformly spaced around the periphery thereof. The outer surface of the outer sleeve abuts the inner surface of stator housing 19 securely to prevent slippage of the stator member relative to the housing. The inner surface of the inner sleeve is a smooth bearing surface in which rotor members 48 are guided for smooth rotary motion.

Rotor members 48 comprise hub portions from which blade or vane members 49 extend and a sleeve portion. The exterior surface of the sleeve portion is a smooth bearing surface which fits the inner bearing surface of the inner sleeve of stator member 26. The inner surface of the rotor sleeve and hub is a smooth surface which is provided with a groove or keyway for securing rotor member 48 non-rotatably on rotor shaft 44.

Figure 5:
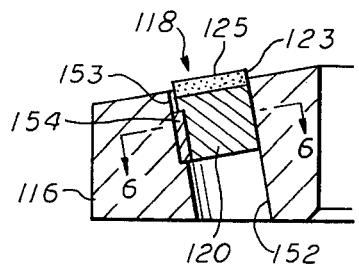

In FIGS. 4 and 5 of U.S. Pat. No. 4,114,702, there are shown detail end views of the blade or vane members 49 and 27, respectively. The blade member 49 is shown in substantially enlarged detail. Vane member 49 has an upper end which is the inlet end of the vane for receiving fluid (i.e. mud) and the lower end which is the outlet or exit end for discharge of fluid from the blade or vane. The structure of the vane or blade members 27 of stator 26 is the mirror image of vane or blade members 49 in all details.

Rotor members 48 are positioned on rotor shaft 44 in a stacked relation, as shown in FIG. 1A, with vane or blade members 49 aligned vertically with vane or blade members 27 of stator members 26. Rotor members 48 are positioned on shaft 44 with their keyways aligned with a longitudinally extending groove in rotor shaft 44. A steel wire (not shown) is inserted in the mating grooves of shaft 44 and rotor members 48 to secure the rotor members non-rotatably thereon.

The lower end of the stack of rotor members abuts rotor spacer ring 64 which seats against the upper end 65 of splined connecting members to be subsequently described. At the upper end of rotor shaft 44 there is a cap or makeup screw member 66 which is internally threaded at 67 and forms a tight threaded connection with the threaded end portion 46 of rotor shaft 44. When cap member 66 is tightened in position, its lower end portion 68 abuts the uppermost rotor member 48 and compresses the stack of rotor members tightly on rotor shaft 44. Cap member 66 is closed at its upper end and has one or more threaded apertures 69 in which there are positioned set screws 70 to secure cap member 66 against loosening during operation.

Upper spline member 71 has an upper end portion 65 abutting rotor spacer ring 64 as previously described. Spline member 71 is internally threaded and forms a threaded connection 72 with the lower end portion 47 of rotor shaft 44. Spline member 71 is hollow and has an exterior surface 73 spaced from the inner surface of stator makeup sleeve 30 to define an annular passageway therebetween. Spline member 71 has a plurality of passages 74 opening into the interior thereof for passage of fluid from the turbine section of the turbodrill. The lower end portion 75 of spline member 71 has a plurality of grooves 77 in the lower or box portion 75 thereof which receive spline pins 78.

A lower spline member 79 has upper pin portion 80 provided with grooves 81 which receive the other side of spline pins 78. Spine member 75 has a peripheral shoulder 82 which receives the lower end of space member 76. The lower or box end 83 of spline member 79 is internally threaded to receive the upper end of bearing shaft 84 in a fitted connection as indicated at 85. A set screw 86 is provided to prevent loosening of threaded joint 85 during operation. Spline member 79 has interior longitudinal passage 87 which opens into the interior longitudinal passage 88 in bearing shaft 84 at the other end. Spline member 71 and 79 and spline pins 78 provide a splined drive connection between rotor shaft 44 and bearing shaft 84.

THE BEARING SECTION

Bearing shaft 84 is provided with an upper sleeve 89 which abuts the lower end 83 of spline member 79 at its upper end and abuts another bearing shaft sleeve 90 at its lower end. The outer surface of sleeve 89 is spaced from the inner surface 41 of bearing pack housing 35 to define an annular passage 91 in which there is positioned a lubricant grease or oil and a pair of annular-shaped floating piston members 92 and 93, respectively.

Piston member 92 comprises a piston body 94 with chevron-shaped seals 95 on one side and elastic compressible seals 96 on the other side. Seals 95 and 96 are compressed by end cap 97 held in place by a cap screw (not shown). The seals on piston member 92 are of well known design and includes a central spacer member and end spacers which are compressed against the seals by end cap 97.

Piston member 93 is constructed identically to piston member 92 and the detailed parts thereof are not separately identified. Piston members 92 and 93 have a sliding fit in the space between the inner surface 41 of bearing pack housing 35 and the outer surface of sleeve member 89 and have lubricant grease or oil positioned between the piston members and in the space below piston member 93.

The bottom end of lubricant chamber 91 is defined by the upper end surfaces of housing upset ring spacer 98 and bearing sleeve 90. At the lower end of lubricant chamber 91 there are provided a pair of openings closed by pipe plugs 99 and 100, which are used for filling the chamber 91 with lubricant.

The lower end of ring spacer 98 is enlarged and has a shoulder portion 101 which abuts the bevel or shoulder 42 on housing 35. The lower end of spacer 98 abuts the upper end of bearing housing spacer 102. The lower end of bearing shaft sleeve 89 abuts spacer sleeve 90. Passageway 103 extends through spacer 98 and bearing housing spacer 102 to permit lubricant flow into the bearing area below. The combined radial and vertical thrust bearings are positioned below sleeve 90 and spacer 98 and are sealed against lubricant leakage at the bottom of the drill by a radial seal.

A bearing shaft sleeve 109 is positioned on bearing shaft 84 for rotation therewith and abuts the lower end of bearing sleeve 90. Below ring 98, there are provided a pair of spacer rings 113 and 114 of spherically curved, self centering cross section which abut the uppermost combined radial and vertical thrust bearing 115.

THE DIAMOND RADIAL/THRUST BEARINGS

The radial/thrust bearing 115 consists of upper annular bearing plate or ring 116, lower bearing ring 117, and a plurality of diamond bearing elements 118 and 119 spaced equally around the bearing plate/rings. Bearing plate/rings 116 and 117 have tapered conical faces with bearing elements 118 and 119 extending radially therethrough. Bearing elements 118 and 119 are preferably diamond cutting elements, e.g. Stratapax cutters manufactured by General Electric Company and described in Daniels, et al. U.S. Pat. No. 4,156,329, Rowley, et al. U.S. Pat. No. 4,073,354 and in considerable detail in Advanced Drilling Techniques by William C. Maurer.

The Stratapax cutting elements 118 and 119, used herein as bearings, each consists of a cylindrical supporting stud 120 of sintered carbide. Stud 120 is beveled at the bottom as indicated at 121 and has a flat top end susface 122 which is normal to the axis of the cylindrical stud. A disc shaped cutting or bearing element 123 is bonded on top end surface 122, preferably by brazing or the like as indicated at 124.

Disc shaped bearing element 123 is a sintered carbide disc having a flat bearing surface 125 comprising polycrystalline diamond. Supposting studs 120 of bearing elements 118 and 119 may have a tight interference fit in recesses in bearing plate/rings 116 and 117 or be otherwise secured therein as shown and described for FIGS. 5-12.

The intermediate and lower radial/thrust bearings, described below, are constructed identically to the upper radial/thrust bearings 115 and have the same reference numerals with the addition of the suffixes "a" and "b". The bearing elements 118 and 119, in each of the bearings, are of a size and sufficient in number around the bearing plate/rings 116 and 117 so that each bearing element is wider than the circumferential distance between adjacent bearing elements. In addition, there is preferably one more of the bearing elements on one of the bearing plate/rings 116 or 117 which assures that the bearing elements are overlapping most of the time.

Upper bearing plate/ring 116 fits tightly against housing 35 and has a clearance relative to sleeve 109 so that it remains stationary relative to the housing. Lower bearing plate/ring 117 has a tight fit on sleeve 109 and a clearance relative to the inner wall surface of housing 35 so that it is fixed relative to shaft 84 and rotates therewith.

The conical faces of plate/rings 116 and 117 are closely spaced in substantially parallel relation. The diamond bearing elements 118 and 119 extend from the conical faces substantially normal to or radially of the plate/rings in which they are supported and into bearing contact with each other. The diamond bearing elements 118 and 119 therefore are in a position of relative bearing movement along a conical contacting surface midway between the conical surfaces of their supports 116 and 117.

The diamond bearing elements 118 and 119 constitute the sole bearing surfaces supporting both radial and longitudinal thrust loads in the drilling tool. After a break in period, the flat surfaces of elements 118 and 119 wear into a conical shape corresponding to the conical surface of contact. The diamond surfaces of elements 118 and 119 are highly resistant to erosive wear, even in the presence of drilling mud.

A thrust bearing spacer ring 126 is fitted tightly on bearing shaft 84 and has a clearance relative to housing 35 and having slots 126c permitting fluid flow thereby. The lower end of spacer 126 abuts bearing shaft sleeve 127. The lower end of spacer 126 also abuts the upper ring of the intermediate radial/thrust bearing 115a.

The intermediate radial/thrust bearing 115a consists of upper ring 117a which fits tightly on bearing shaft sleeve 127 and has a small clearance relative to the inner surface of housing 35 so that it is fixed relative to shaft 84 and rotates therewith. There is also provided a lower bearing ring 116a which fits tightly against housing 35 and has a clearance relative to sleeve 127 so that it remains stationary relative to the housing.

A plurality of diamond bearing elements 118a and 119a are equally spaced and secured in place around bearing plate/rings 116a and 117a as described above for the upper thrust bearing 115. The conical faces of plate/rings 116a and 117a are closely spaced in substantially parallel relation. The diamond bearing elements 118a and 119a extend from the conical faces substantially normal to or radially of the plate/rings in which they are supported and into bearing contact with each other.

The diamond bearing elements 118a and 119a therefore are in a position of relative bearing movement along a conical contacting surface midway between the conical surfaces of their respective supports 116a and 117a. The diamond bearing elements 118a and 119a constitute the sole bearing surfaces supporting both radial and longitudinal thrust loads in the drilling tool. After a break-in period, the flat surfaces of elements 118a and 119a wear into a conical shape corresponding to the conical surface of contact. The diamond surfaces of elements 118a and 119a are highly resistant to erosive wear, even in the presence of drilling mud.

The conical faces on bearing plate/rings 116 and 117 are tapered in the opposite direction from the conical faces of bearing plate/rings 116a and 117a. As a result, the upper bearing 115 carries upward thrust loads and radial loads while the intermediate bearing 115a carries downward thrust loads and radial loads.

Immediately below the bearing ring 116a are a pair of spacer rings 113a and 114a of spherically-curved, self-centering cross section which bear against spacer ring 126a. Below spacer ring 126a, there is positioned the lower radial/thrust bearing 115b which is of substantially the same construction as intermediate bearing 115a.

The lower radial/thrust bearing 115b consists of upper ring 117a which fits tightly on bearing shaft sleeve 127a and has a small clearance relative to the inner surface of housing 35 so that it is fixed relative to shaft 84 and rotates therewith. There is also provided a lower bearing ring 116b which fits tightly against housing 35 and has a clearance relative to sleeve 127a so that it remains stationary relative to the housing.

A plurality of diamond bearing elements 118b and 119b are equally spaced and secured in place around bearing plate/rings 116b and 117b as described above for the intermediate radial/thrust bearing 115a. The conical faces of plate/rings 116b and 117b are closely spaced in substantially parallel relation. The diamond bearing elements 118b and 119b extend from the conical faces substantially normal to or radially of the plate/rings in which they are supported and into bearing contact with each other as described for intermediate radial/thrust bearing 115a, above.

The diamond bearing elements 118b and 119b therefore are in a position of relative bearing movement along a conical contacting surface midway between the conical surfaces of their respective supports 116b and 117a. The diamond bearing elements 118b and 119b constitute the sole bearing surfaces supporting both radial and longitudinal thrust loads in the drilling tool. After a break-in period, the flat surfaces of elements 118b and 119b wear into a conical shape corresponding to the conical surface of contact. The diamond surfaces of elements 118b and 119b are highly resistant to erosive wear, even in the presence of drilling mud, and the bearings have much longer life than other types of roller or friction bearings.

The conical faces on bearing plate/rings 116 and 117 are tapered in the opposite direction from the conical faces of bearing plate/rings 116b and 117b. As a result, the upper bearing 115 carries upward thrust loads and radial loads while the lower radial/thrust bearing 115b carries downward thrust loads and radial loads.

Below ring member 116b and sleeve 127a there are a pair of spacer rings 114b and 113b of tapered cross section which bear against spacer ring 126a. The taper of rings 114b and 113b is opposite to the taper of rings 113 and 114 associated with upper radial/thrust bearing 115.

AN ALTERNATE BEARING ARRANGEMENT

In FIG. 2, an alternate embodiment of the radial/thrust bearings 115-115b is shown in which compression springs comprising Belleville spring washers 111 and 111a are positioned against bearing plate/rings 116 and 117a, respectively, to maintain the bearings under compression.

VARIOUS ARRANGEMENTS FOR BEARING INSERT RETENTION

In FIGS. 5-12, there are shown a variety of means for securing the bearing inserts 118, 119, etc. in position.

Figure 12:
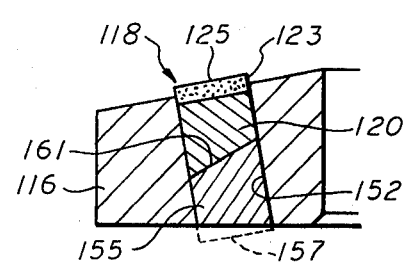

The embodiment shown in FIG. 12 is substantially that shown in FIG. 1C but on a slightly larger scale. Bearing insert 118 is shown with the supporting stud portion 120 positioned in a recess 151 in supporting plate/ring 116 by brazing material 151a placed in the bottom of the recess prior to assembly. The bearing assembly is subsequently heated to fuse the brazing material in the bottom of recess 151. Diamond bearing element 123 and bearing surface 125 protrude above the surface, as shown.

In FIGS. 5 and 6, there is shown an embodiment in which the supporting stud for the bearing insert is secured by a retaining pin. Supporting plate/ring 116 has a passage 152 extending completely through from the conical face in a direction substantially normal thereto. Bearing insert 118 has its supporting stud 120 positioned tightly therein. A small passage 153 extends longitudinally of passage 152 and intersects both the wall of the passage and the side wall of the supporting stud. A retaining pin 154 is positioned in passage 153 by a press fit or interference fit to retain the bearing insert against dislodgement.

In FIG. 7, there is shown an embodiment in which the supporting stud for the bearing insert is secured by a metal retaining plug. Supporting plate/ring 116 has a passage 152 extending completely through from the conical face in a direction substantially normal thereto. Bearing insert 118 has its supporting stud 120 positioned tightly therein against a metal retaining plug 155 which is secured by welding as indicated at 156.

Figure 8:
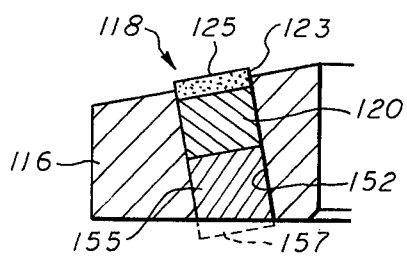

In FIG. 8, there is shown an embodiment in which the supporting stud for the bearing insert is secured by a metal retaining plug held in place by an interference fit. Supporting plate/ring 116 has a passage 152 extending completely through from the conical face in a direction substantially normal thereto. Bearing insert 118 has its supporting stud 120 positioned tightly therein against a metal retaining plug 155 which is secured in place by an interference fit. The excess material 157 of plug 155 is cut or ground away as indicated in dotted line.

Figure 9:
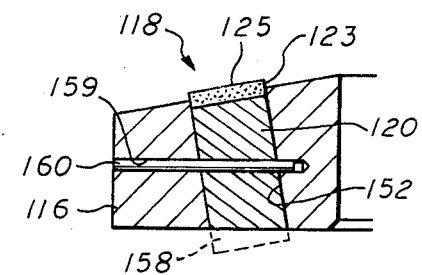

The embodiment shown in FIG. 9 utilizes a transversely extending retaining pin to secure the bearing insert 118 in place. Bearing insert 118 has its supporting stud 120 of sufficient length to extend completely through passage 152 and the excess material below the under face of plate/ring 115 is cut or ground away as indicated at 158. A lateral passage 159 extends through the edge of supporting plate/ring 116 into the supporting stud 120. A retaining pin 160 is positioned in passage 159 by a press fit or interference fit to prevent dislodgement of the bearing insert.

Figure 10:
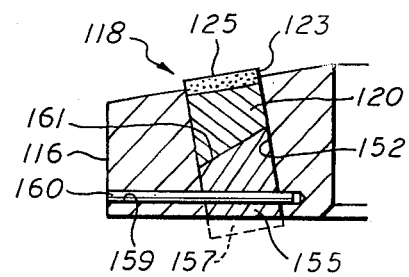

In the embodiment of FIG. 10, there is shown an arrangement similar to that of FIGS. 7 and 8 where a metal retaining plug 155 is used to secure the bearing insert stud 120 in place. In this embodiment, the metal plug has its lower end cut off flush with the under surface of plate 116 as shown at 157. A transverse passage 159 extends into metal plug 155 and retaining pin 160 is positioned tightly therein to secure the plug 155 and stud 120 in place. The metal plug 155 and stud 120 have their abutting faces cut at an angle as indicated at 161 which resists twisting by the bearing insert.

In FIG. 12, the bearing insert 118 is secured by retaining plug 155 as in FIG. 8 but the abutting faces of plug 155 and stud 120 are cut at an angle as in the embodiment shown in FIG. 10.

THE BEARING SEALS

Below the lower radial/thrust bearing 115b, there is positioned bearing spacer 130 which fits tightly within the bearing housing 35 and supports annular support ring 130a for the self-centering spacers 113b and 114b. There is also positioned bearing shaft upset spacer ring 131 which has a shoulder 132 which abuts against shoulder 133 on the bearing shaft. Space between spacers 130 and 131 is sufficient for passage of lubricant to the upper end of the rotary bearing seal.

At the lower end of housing 35, bearing makeup sub 38 is tightened against the lower end of bearing spacers 130 and 131. On the bearing shaft 84, there is positioned bearing seal sleeve 137 which, at its upper end abuts the lower end of bearing spacer 131 and at its lower end abuts bearing shaft end ring 138 which is fitted on shoulder 139 of the enlarged lower end 140 of the bearing shaft. Bearing makeup sub 138 is secured against separation of its threaded connection by cooperating grooves 20b and 21b enclosing lock ring 22b. Holes 23b provided with a peripheral groove 24b in which there is positioned an "O" ring seal 25b.

A dynamic radial seal is provided between sub 38 and seal sleeve 137 to prevent loss of lubricant from the bearings. The seal is a chevron-type seal having upper and lower backup rings 141 and 142, respectively. The middle portion of the seal is a spacer member 143. Above and below the spacer medium are positioned a plurality of chevron seals 144 which are maintained in compression to provide a seal against sub 38 and against sleeve 137 to prevent leakage of lubricant from the bearings during operation of the turbodrill. Upper spacer member 141 abuts a retaining ring 145 and is held in place thereby. The lower end of spacer ring 142 abuts compression spring 146 which is positioned in groove 147.

The lower enlarged end portion 140 of bearing shaft 84 is threaded internally as indicated at 148. This threaded opening recives and secures in place the hollow connector sub 149 of drill bit 150. The turbodrill is illustrated as driving a rotary-type drill bit 150. It should be understood that any suitable drill bit could be used of the types used with conventional drills utilizing down hole motors. In particular, the turbodrill is particularly useful with solid head diamond bits as is illustrated in Fox U.S. Pat. No. 3,971,450.

OPERATION

The turbodrill is assembled as illustrated in FIGS. 1A, 1B, 1C, and 1D. Except for the bearing section, this turbodrill is substantially the same as the turbodrill shown in U.S. Pat. Nos. 4,114,702; 4,114,703 and 4,114,704. It is also similar to the turbodrill shown in co-pending application Ser. No. 306,290, filed Sept. 28, 1981 except for the combined radial/thrust bearing shown herein. The housing is in several sections, as described above, and is threadedly connected at several points. Since the turbodrill housing is held stationary and the drill is driven at high speed there are substantial torques placed upon the threaded joints which tend to cause those joints to unscrew.

In the past, threaded joints have been protected against unscrewing by use of set screws. However, set screws sometimes come loose and the desired protection for the threaded joint may not be obtained. In this tool, the threaded joints are protected by a lock ring arrangement which is shown in use for several threaded connections. When threaded connection 33 is made, the housing 29 slides past lock ring 22a until grooves 20a and 21a reach a mating relation, at which point, lock ring 22a springs into the position indicated locking the parts together to prevent separation of the thread. The lock ring may be compressed to permit the joint to be unscrewed using a suitable tool such as that shown in FIG. 7 of U.S. Pat. No. 4,114,702.

During assembly of the apparatus a suitable lubricant grease or oil, which will withstand the temperatures normally encountered by the turbodrill, is introduced through the lower opening 100, after unplugging the same, to fill the lower portion of the turbodrill with lubricant. The lubricant introduced through opening 100 fills and completely surrounds the bearings and the radial seals. Lubricant is also introduced through opening 99, after unplugging the same, to fill the space above piston 93 and cause piston 92 to rise above it. Sufficient lubricant is introduced to cause the pistons to be positioned substantially as shown in full line in FIGS. 1B and 1C. The holes 99 and 100 are plugged to prevent loss of lubricant.

When the turbodrill is connected to drill string 14 as shown in FIG. 1A, drilling mud is pumped through the drill string at a high rate of flow and through the turbodrill. The drilling mud flows through passage 15 into the annular space at the upper end of the turbine section. The drilling mud flows through each of the turbine stages causing the turbine to rotate at high speed. The drilling mud flows past each of the vanes 27 of the stator members 26 and is directed from those vanes at a high viscosity against vanes 49 of rotor members 48. The shape of the vanes particularly the exit angle, is designed to create a maximum thrust on the rotor members and a maximum torque on the rotor shaft 44 as the drilling mud is pumped through the turbine section. As indicated above, a large number of turbine elements make up the turbine section. In a typical 7¾ inch turbodrill, there are fifty sets of stator members and fifty sets of rotor members, which results in the production of a high torque and a high speed of turning of the rotor shaft 44.

The rotor shaft 44 which is turning at a high rate of speed is connected by a splined connection, as described above, to bearing shaft 84. The drilling mud flows from the turbine section the the annular space around the splined connection and through the passage in the middle of the splined connection into the hollow passage 88 extending through the bearing shaft to the exterior of the frill whese the mud is discharged through the drill bit (whether a rotary bit or a solid head bit) and then flows back up the hole being drilled to remove cuttings from the hole. The drill mud flows at least partly around the splined connection at the top of the bearing shaft and applies a hydraulic force against the upper end of piston 92.

The piston 92 is therefore maintained under a high hydrostatic pressure of drilling mud which is flowing through the turbodrill. The pressure on piston 92 presses against the lubricant in the space below the piston 93 and lubricant around the bearings and radial seal under a substantial hydrostatic pressure. In the past, floating pistons have been used to pressurize lubricant systems in turbodrill. However, drilling mud has eventually eroded the pistons and penetrated into the bearing and sealing areas which resulted in the destruction of the working parts of the turbodrill. In this construction, the double piston arrangement with lubricant providing a hydraulic fluid between the pistons protects the lower piston against contamination by the drilling mud and provides protection and greater life for the seal.

In the operation of the turbodrill, the design of bearings and of seals is of critical importance. The bearings and the seals in prior art turbodrills are the points where the highest incidence of failure has occurred.

In this turbodrill the radial/thrust bearings 115, 115a and 115b are an important feature of construction. There are three sets of radial/thrust bearings used. The upper thrust bearings 115 carry both the radial load or thrust and the upward thrust produced during drilling. The intermediate and lower radial/thrust bearings 115a and 115b carry both the radial load or thrust and the load or thrust downward produced when the motor is rotated off bottom. The improved radial/thrust bearings described above are diamond thrust bearings in the form of Statapax inserts 118(a,b) and 119(a,b) supported on two annular plates or rings 116(a,b) and 117(a,b). These bearing inserts 118 and 119 have flat bearing faces 125 of polycrystalline diamond, which wear into conical bearing faces, have exceptionally long wearing life, and will carry substantial longitudinal and radial thrust loads. The inserts may be retained in position by any of the means described above in connection with the embodiments shown in FIGS. 5–12.

As noted above, the seals in the bearing section and the lubrications system are of substantial importance. The bearings in prior art turbodrills have had very short lives because they operated under direct exposure to the drilling mud. In this turbodrill, the entire bearing section is operated with a sealed lubrication system where the oil or grease is pressurized by floating pistons as previously described. The seals which prevent the loss of lubricant from the bearing section are important. The prior art drills which have attempted to use sealed lubricant systems have generally used packing type seals or compressed rubber seals which in many cases apply such high forces to the bearing shaft as to make it difficult to rotate. In this turbodrill, the rotary seal for the bearings is a multiple chevron-type seal, or equivalent rotary seal, which prevents loss of lubricant, prevents intrusion of drilling mud to the bearings, thus, increasing substantially the life of the bearings and of the drill. However, even if there is leakage of drilling mud into the bearings the polycrystalling bearing surfaces are not adversely affected.

ANOTHER EMBODIMENT

In FIGS. 1E and 1F, there is shown another embodiment of the turbodrill in which the lubrication system has been eliminated and the bearings are lubricated solely by flow of drilling fluid therethrough. In this embodiment, the various parts have the same reference numerals as in FIGS. 1A to 1D except that the numerals are increased by 200 to avoid confusion. Thus part 19 in FIG. 1B becomes part 219 in FIG. 1E and part 144 in FIG. 144 in FIG. 1D becomes part 344 in FIG. 1F. The description will be partially repeated to clarify the construction where parts have been eliminated. The description of FIGS. 1E and 1F is therefore limited to the description of a modified bearing section for the turbodrill.

Spline member 71 (FIG. 1A) is internally threaded and forms a threaded connection 272 with the lower end portion 247 of rotor shaft 44 (FIG. 1A). Spline member 71 is hollow and has an exterior surface 73 spaced from the inner surface of stator makeup sleeve 30 to define an annular passageway therebetween. Spline member 71 has a plurality of passages 274 (FIG. 1E) opening into the interior thereof for passage of fluid from the turbine section of the turbodrill. The lower end portion 275 of spline member 71 has a plurality of grooves 277 in the lower or box portion 75 thereof which receive spline pins 278.

A lower spline member 279 has upper pin portion 280 provided with grooves 281 which receive the other side of spline pins 278. Spine member 275 has a peripheral shoulder 282 which receives the lower end of space member 276. The lower or box end 283 of spline member 279 is internally threaded to receive the upper end of bearing shaft 284 in a threaded connection as indicated at 285. A set screw 286 is provided to prevent loosening of threaded joint 285 during operation. Spline member 279 has an interior longitudinal passage 287 which opens into the interior longitudinal passage 288 in bearing shaft 284 at the other end. Spline members 271 and 279 and spline pins 278 provide a splined drive connection between rotor shaft 244 and bearing shaft 284.

MODIFIED BEARING SECTION

Bearing shaft 284 is provided with an upper sleeve 289 which abuts the lower end 283 of spline member 279 at its upper end and abuts another bearing shaft sleeve 309 at its lower end. The lower end of ring spacer 298 is enlarged and has a shoulder portion 301 which abuts the bevel or shoulder 242 on housing 235. The lower end of spacer 298 abuts the upper end of bearing spacer 298a. The lower end of bearing shaft sleeve 289 abuts spacer sleeve 309. Ring spacer 298 is spaced from sleeve 289 to provide an annular passage 303 therebetween. Below ring 298, there are provided a pair of spacer rings 313 and 314 of spherically curved, self centering cross section which abut the uppermost combined radial and vertical thrust bearing 315.

THE DIAMOND RADIAL/THRUST BEARINGS

The radial/thrust bearing 315 consists of upper annular bearing plate or ring 316, lower bearing ring 317, and a plurality of diamond bearing elements 318 and 319 spaced equally around the bearing plate/rings. Bearing plate/rings 316 and 317 have tapered conical faces with bearing elements 318 and 319 extending radially therethrough. Bearing elements 318 and 319 are preferably diamond cutting elements, e.g. Stratapax cutters as described above.

Upper bearing plate/ring 316 fits tightly against housing 235 and has a clearance relative to sleeve 309 so that it remains stationary relative to the housing. Lower bearing plate/ring 317 has a tight fit on sleeve 309 and a clearance relative to the inner wall surface of housing 235 so that it is fixed relative to shaft 284 and rotates therewith.

The conical faces of plate/rings 316 and 317 are closely spaced in substantially parallel relation. The diamond bearing elements 318 and 319 extend from the conical faces substantially normal to or radially of the plate/rings in which they are supported and into bearing contact with each other. The diamond bearing elements 318 and 319 therefore are in a position of relative bearing movement along a conical contacting surface midway between the conical surfaces of their supports 316 and 317.

The diamond bearing elements 318 and 319 constitute the sole bearing surfaces supporting both radial and longitudinal thrust loads in the drilling tool. After a break in period, the flat surfaces of elements 318 and 319 wear into a conical shape corresponding to the conical surface of contact. The diamond surfaces of elements 318 and 319 are highly resistant to erosive wear, even in the presence of drilling mud.

A thrust bearing spacer ring 326 is fitted tightly on bearing shaft 284 and has a clearance relative to housing 235 and slots 326c permitting fluid flow thereby. The lower end of spacer 326 abuts bearing shaft sleeve 327. The lower end of spacer 326 also abuts the upper ring of the lower radial/thrust bearing 315a. The lower bearing 315a consists of upper ring 317a which fits tightly on bearing shaft sleeve 327 and has a small clearance relative to the inner surface of housing 235 so that it is fixed relative to shaft 284 and rotates therewith. There is also provided a lower bearing ring 316a which fits tightly against housing 235 and has a clearance relative to sleeve 327 so that it remains stationary relative to the housing.

Diamond bearing elements 318a and 319a are equally spaced and secured in place around bearing plate/rings 316a and 317a as described above for the upper thrust bearing 315. The conical faces of plate/rings 316a and 317a are closely spaced in substantially parallel relation. The diamond bearing elements 318a and 119a extend from the conical faces substantially normal to or radially of the plate/rings in which they are supported and into bearing contact with each other.

The diamond bearing elements 318a and 319a therefore are in a position of relative bearing movement along a conical contacting surface midway between the conical surfaces of their respective supports 316a and 317a. The diamond bearing elements 318a and 319a constitute the sole bearing surfaces supporting both radial and longitudinal thrust loads in the drilling tool. After a break-in period, the flat surfaces of elements 318a and 319a wear into a conical shape corresponding to the conical surface of contact. The diamond surfaces of elements 318a and 319a are highly resistant to erosive wear, even in the presence of drilling mud.

The conical faces on bearing plate/rings 316 and 317 are tapered in the opposite direction from the conical faces of bearing plate/rings 316a and 317a. As a result, the upper bearing 315 carries upward thrust loads and radial loads while the lower bearing 315a carries downward thrust loads and radial loads.

Immediately below the bearing ring 316a are a pair of spacer rings 313a and 314a of spherically-curved, self-centering cross section which bear against supporting ring 330. Below the lower radial/thrust bearing 315b, there is positioned bearing spacer 330 which fits tightly within the bearing housing 35 and supports annular support ring 330a for the self-centering spacers 313b and 314b. There is also positioned bearing shaft upset spacer ring 331 which has a shoulder 332 which spaced from shoulder 333 on the bearing shaft. Space between spacers 330 and 331 is sufficient for passage of lubricant to the upper end of the rotary bearing seal.

At the lower end of housing 235, bearing makeup sub 238 is tightened against the lower end of bearing spacers 330 and 331. On the bearing shaft 284, there is positioned bearing seal sleeve 337 which, at its upper end abuts the lower end of bearing spacer 331 and at its lower end abuts bearing shaft end ring 338 which is fitted on shoulder 339 of the enlarged lower end 340 of the bearing shaft. Bearing makeup sub 338 is secured against separation of its threaded connection by cooperating grooves 220b and 221b enclosing lock ring 222b. Holes 223b provided with a peripheral grove 224b in which there is positioned an "O" ring seal 225b.

A dynamic radial seal is provided between sub 238 and seal sleeve 337 to prevent loss of lubricant from the bearings. The seal is a chevron-type seal having upper and lower backup rings 341 and 342, respectively. The middle portion of the seal is a spacer member 343. Above and below the spacer medium are positioned a plurality of chevron seals 344 which are maintained in compression to provide a seal against sub 238 and against sleeve 337 to prevent leakage of lubricant from the bearings during operation of the turbodrill. Upper spacer member 341 abuts a retaining ring 345 and is held in place thereby. The lower end of spacer ring 342 abuts compression spring 346 which is positioned in groove 347.

The lower enlarged end portion 340 of bearing shaft 284 is threaded internally as indicated at 348. This threaded opening recives and secures in place the hollow connector sub 349 of drill bit 350. The turbodrill is illustrated as driving a rotary-type drill bit 350.

The operation of this embodiment of the turbodrill is the same as that described for the embodiment of FIGS. 1A-1D except for the omission ot the lubrication system and the floating piston structure used therein.

In this embodiment of the turbodrill, the radial/thrust bearings 315 and 315a are an important feature of construction. There are two sets of radial/thrust bearings used. The upper thrust bearings 315 carry both the radial load or thrust and the upward thrust produced during drilling. The lower radial/thrust bearings 315a carry both the radial load or thrust and the load or thrust downward produced when the motor is rotated off bottom. The improved radial/thrust bearings described above are diamond thrust bearings in the form of Statapax inserts supported on two annular plates or rings. These bearing inserts have flat bearing faces of polycrystalline diamond, which wear into conical bearing faces, have exceptionally long wearing life, and will carry substantialy longitudinal and radial thrust loads, all as described above. The inserts may be retained in position by any of the means described above.

In this embodiment of the turbodrill, the bearing section is operated without a sealed lubrication system and the entire structure is substantially shortened in length. Lubricant can be added as needed or the mud may be allowed to leak through the bearings to provide lubrication and cooling.

While this invention has been described fully and completely with special emphasis upon several preferred embodiments, it should be understood that other equivalent means of carrying out the inventive features may be utilized without departing from the scope and intent of coverage of this invention. It should also be noted that while the device described, as a whole, is a turbodrill, the improved bearing design is applicable to other types of down-hole drilling motors, e.g. positive displacement motors and the like.

We claim:

1. A down hole well drilling tool adapted for connection at one end to the lower end of a drill string and at the other end to a drill bit to be driven thereby, comprising tubular housing means and rotary shaft means supported therein and extending therefrom and adapted to support a drill bit, motor means in said housing means actuated by flow of drilling fluid therethrough and operable to rotate said shaft means, bearing means in said housing means supporting said rotary shaft means, in which said bearing means comprises at least two radial/thrust bearings, each having one bearing member supported on said housing and another bearing member, having rotary bearing contact therewith, supported on and rotatable with said shaft means, said bearing members having initially flat surfaces meeting on a substantially conical surface of contact, said bearing members, after break in, having substantially conical bearing surfaces meeting for smooth rotary bearing contact on said conical surface of contact, and said conical bearing surfaces each having bearing faces of diamond comprising the only bearing surfaces in said radial/thrust bearing.

2. A down hole well drilling tool according to claim 1 in which said one radial/thrust bearing member in one of said bearings comprises a first annular supporting plate having a conical end surface, a plurality of insert members equally spaced spaced around said first annular plate, extending radially thereof and substantially normal to the conical surface thereof and having initially flat diamond bearing surfaces which wear into a conical bearing surface, said other radial/thrust bearing member in said one bearing comprises a second annular supporting plate having a conical end surface fitting the conical end surface of said first supporting plate, a plurality of insert members equally spaced spaced around said second annular plate, extending radially thereof and substantially normal to the conical surface thereof and having initially flat diamond bearing surfaces which wear into a conical bearing surface against said first-named diamond bearing surfaces, said one radial/thrust bearing having said conical bearing surfaces at an angle supporting radial thrust loads and supporting longitudinal thrust loads in one direction, said one radial/thrust bearing member in another of said bearings comprises a third annular supporting plate having a conical end surface at an angle opposite to said first-named conical end surface, a plurality of insert members equally spaced spaced around said third annular plate, extending radially thereof and substantially normal to the conical surface thereof and having initially flat diamond bearing surfaces which wear into a conical bearing surface, said other radial/thrust bearing member in said other bearing comprises a fourth annular supporting plate having a conical end surface fitting the conical end surface of said third supporting plate, a plurality of insert members equally spaced spaced around said fourth annular plate, extending radially thereof and substantially normal to the conical surface thereof and having initially flat diamond bearing surfaces which wear into a conical bearing surface against said last-named diamond bearing surfaces, said other radial/thrust bearing having said conical bearing surfaces at an angle supporting radial thrust loads and supporting longitudinal thrust loads in the opposite direction to said one bearing.

3. A down hole well drilling tool according to claim 1 in which
said diamond bearing faces comprise polycrystalline diamond.

4. A down hole well drilling tool according to claim 2 in which
said first named and said second named insert members comprise cylindrical hardmetal studs, and
said diamond bearing surfaces comprise polycrystalline diamond discs secured thereon.

5. A down hole well drilling tool according to claim 2 or 4 in which
the plurality of inserts on one of said annular supporting plates is different in number from the plurality of inserts on the other annular supporting plate.

6. A down hole well drilling tool according to claim 4 in which
said inserts are supported in the respective annular supporting plates in cylindrical recesses or passages therein by an interference fit.

7. A down hole well drilling tool according to claim 4 in which
each of said annular plates has a plurality of passages extending from the conical face to the opposite side thereof for receiving said insert member studs, a passage extending along the surface of each of said first-named passages intersecting the side wall of the stud positioned therein, and a retaining pin positioned in each of said last named passages and retained by an interference fit to retain said studs in position.

8. A down hole well drilling tool according to claim 4 in which
each of said annular plates has a plurality of passages extending from the conical face to the opposite side thereof for receiving said insert member studs,
a plurality of passages extending laterally through said plate into each of said first-named passages and the insert stud positioned therein, and
a retaining pin positioned in each of said last-named passages into each stud for retaining the same in position.

9. A down hole well drilling tool according to claim 4 in which
each of said annular plates has a plurality of passages extending from the conical face to the opposite side thereof for receiving said insert member studs, and
a cylindrical metal retaining plug positioned in each of said passages retaining the respective insert members in position.

10. A down hole well drilling tool according to claim 9 in which
said retaining plugs are each welded in their respective passages.

11. A down hole well drilling tool according to claim 9 in which
said retaining plugs are each retained in position by an interference fit in said passages.

12. A down hole well drilling tool according to claim 9 including
a plurality of passages extending laterally through said plate into each of said first-named passages and the retaining plud positioned therein, and
a retaining pin positioned in each of said last-named passages into each retaining plug for retaining the same in position.

13. A down hole well drilling tool according to claim 9 or 12 in which
each stud and the retaining plug therefor have abutting end faces in a plane at an acute angle to the axes thereof.

14. A bearing pack for a down hole well drilling tool comprising
a bearing housing adapted to be connected to the housing of a well-drilling, fluid actuated down-hole motor,
a rotary bearing shaft positioned in said bearing housing having one end adapted to support a drill bit and another end adapted to be driven with a rotary shaft of a well drilling fluid actuated down hole motor when assembled thereon,
bearing means in said bearing housing supporting said bearing shaft, in which
said bearing means comprises at least two radial/thrust bearings, each having one bearing member supported on said housing and another bearing member, having rotary bearing contact therewith, supported on and rotatable with said rotary shaft means,
said bearing members having initially flat surfaces meeting on a substantially conical surface of contact, said bearing members, after break in, having substantially conical bearing surfaces meeting for smooth rotary bearing contact on said conical surface of contact, and said conical bearing surfaces each having bearing faces of diamond comprising the only bearing surfaces in said radial/thrust bearing.

15. A bearing pack according to claim 14 including
rotary seal means positioned below said bearing means in said bearing housing,
lubricant fluid filling the space around said bearing shaft from the level of said rotary seal means to a predetermined level above said bearing means, and
piston means sealing the space between said bearing housing and shaft at the upper surface of said lubricant fluid and adapted to be actuated by drilling fluid pressure to maintain said lubricant fluid under pressure to lubricate said bearing means.

16. A bearing pack according to claim 14 in which
said one radial/thrust bearing member in one of said bearings comprises a first annular supporting plate having a conical end surface,
a plurality of insert members equally spaced spaced around said first annular plate, extending radially thereof and substantially normal to the conical surface thereof and having initially flat diamond bearing surfaces which wear into a conical bearing surface,
said other radial/thrust bearing member in said one bearing comprises a second annular supporting plate having a conical end surface fitting the conical end surface of said first supporting plate,
a plurality of insert members equally spaced spaced around said second annular plate, extending radially thereof and substantially normal to the conical surface thereof and having initially flat diamond bearing surfaces which wear into a conical bearing surface against said first-named diamond bearing surfaces,
said one radial/thrust bearing having said conical bearing surfaces at an angle supporting radial thrust loads and supporting longitudinal thrust loads in one direction,
said one radial/thrust bearing member in another of said bearings comprises a third annular supporting plate having a conical end surface at an angle opposite to said first-named conical end surface,
a plurality of insert members equally spaced spaced around said third annular plate, extending radially thereof and substantially normal to the conical surface thereof and having initial flat diamond bearing surfaces which wear into a conical bearing surface,
said other radial/thrust bearing member in said other bearing comprises a fourth annular supporting plate having a conical end surface fitting the conical end surface of said third supporting plate,
a plurality of insert members equally spaced spaced around said fourth annular plate, extending radially thereof and substantially normal to the conical surface thereof and having initially flat diamond bearing surfaces which wear into a conical bearing surface against said last-named diamond bearing surfaces,
said other radial/thrust bearing having said conical bearing surfaces at an angle supporting radial thrust loads and supporting longitudinal thrust loads in the opposite direction to said one bearing.

17. A bearing pack according to claim 14 in which
said diamond bearing faces comprise polycrystalline diamond.

18. A bearing pack according to claim 14 in which
said first named and said second named insert members comprise cylindrical hardmetal studs, and
said co-planar diamond bearing surfaces comprise polycrystalline diamond discs secured thereon.

19. A bearing pack according to claim 14 in which
the plurality of inserts on one of said annular supporting plates is different in number from the plurality of inserts on the other annular supporting plate.

20. A radial/thrust bearing for use in rotary tools comprising
a first annular supporting plate having an exterior conical end surface,
a second annular supporting plate having an interior conical end surface of a shape substantially parallel to the exterior conical end surface of said first supporting plate when assembled in bearing relation,
a plurality of insert members equally spaced around said first annular plate, extending radially thereof and substantially normal to the conical surface thereof and having initially flat diamond bearing surfaces positioned in conical relation,
a plurality of insert members equally spaced around said second annular plate, extending radially thereof and substantially normal to the conical surface thereof and having initially flat diamond bearing surfaces positioned in conical relation and adapted to fit against said first-named diamond bearing surfaces along a conical surface of contact when assembled in bearing relation,
said supporting plates being adapted to be secured to relatively rotatable members with said bearing surfaces in rotary bearing contact, and
said initially flat bearing surfaces being adapted to support radial thrust loads and support longitudinal thrust loads in one direction and to wear into conical bearing surfaces corresponding to said conical surface of contact.

* * * * *